United States Patent
Turek (10) Patent No.: US 10,647,549 B2
(45) Date of Patent: May 12, 2020

(54) CHAIN DRIVE FOR A PEOPLE CONVEYOR

(71) Applicant: Otis Elevator Company, Farmington, CT (US)

(72) Inventor: Alexander Turek, Münchendorf (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/164,455

(22) Filed: Oct. 18, 2018

(65) Prior Publication Data
US 2019/0119075 A1 Apr. 25, 2019

(30) Foreign Application Priority Data
Oct. 20, 2017 (EP) .................................. 17197546

(51) Int. Cl.
| | |
|---|---|
| B66B 23/02 | (2006.01) |
| B66B 23/14 | (2006.01) |
| B65G 47/31 | (2006.01) |

(52) U.S. Cl.
CPC ............ B66B 23/024 (2013.01); B65G 47/31 (2013.01); B66B 23/026 (2013.01); B66B 23/14 (2013.01)

(58) Field of Classification Search
CPC ........... F16G 1/28; B65G 15/60; B65G 15/36; B65G 39/20; B65G 15/42; B65G 17/24
See application file for complete search history.

(56) References Cited

U.S. PATENT DOCUMENTS

| | | | |
|---|---|---|---|
| 4,066,161 A * | 1/1978 | Michalon | B65G 23/30 198/334 |
| 4,884,673 A | 12/1989 | Rivera | |
| 4,949,832 A | 8/1990 | Sansevero | |
| 5,184,710 A | 2/1993 | Nakatani | |
| 7,219,784 B2 | 5/2007 | Fargo | |
| 2017/0210602 A1 | 7/2017 | Schulz et al. | |
| 2019/0210843 A1* | 7/2019 | Gartner | B66B 23/12 |

FOREIGN PATENT DOCUMENTS

| | | |
|---|---|---|
| DE | 4101145 A1 | 7/1991 |
| DE | 4134626 C1 | 10/1992 |
| EP | 1306342 A1 | 6/2000 |
| EP | 1939129 A2 | 7/2008 |
| GB | 1171329 A | 11/1969 |
| JP | 2002167149 A | 6/2002 |

(Continued)

OTHER PUBLICATIONS

European Search Report for application EP 17197546.9, dated Mar. 26, 2018, 8 pages.

*Primary Examiner* — Gene O Crawford
*Assistant Examiner* — Lester III Rushin
(74) *Attorney, Agent, or Firm* — Cantor Colburn LLP (57) ABSTRACT

A chain drive (10) for a people conveyor (1) having a plurality of conveyance elements (4) comprises a drive chain (12) which is configured for driving the conveyance elements (4). The drive chain (12) includes a plurality of drive chain links (16) traveling along a closed path including a conveyance portion (5) and a return portion (7). The drive chain (12) further includes a plurality of linkages (42). Each linkage (42) is configured for coupling the drive chain (12) with one of the plurality of conveyance elements (4). The length of each linkage (42) along the path of the drive chain (12) is variable.

14 Claims, 12 Drawing Sheets

(56) References Cited

FOREIGN PATENT DOCUMENTS

| | | | |
|---|---|---|---|
| JP | 4214536 | B1 | 1/2009 |
| JP | 2009184824 | A | 8/2009 |
| JP | 2009190897 | A | 8/2009 |
| JP | 4342215 | B2 | 10/2009 |
| WO | 2006064675 | A1 | 6/2006 |
| WO | 2013152714 | A1 | 10/2013 |
| WO | 2016086964 | A1 | 6/2016 |
| WO | 2017085779 | A1 | 5/2017 |

* cited by examiner

CHAIN DRIVE FOR A PEOPLE CONVEYOR

The application relates to a chain drive for a people conveyor and to a people conveyor comprising such a chain drive.

A people conveyor such as an escalator or a moving walkway usually comprises a conveyance band which is configured for conveying passengers. The conveyance band, which comprises a plurality of conveyance elements, extends and moves between two landing portions. The conveyance band is driven by a chain drive comprising at least one drive chain. The at least one drive chain extends between two turnaround portions located at the landing portions. Guiding the conveyance elements around the turnaround portions needs considerable space. Providing the necessary space at the turnaround portions restricts the design options of the people conveyor.

It therefore would be beneficial to reduce the space needed for guiding the conveyance elements around the turnaround portions.

According to an exemplary embodiment of the invention, a chain drive for a people conveyor having a plurality of conveyance elements comprises a drive chain configured for driving the conveyance elements. The drive chain comprises a plurality of drive chain links traveling along a closed path including a linear conveyance portion and a linear return portion. The conveyance portion is configured for conveying passengers, and the return portion is provided for returning the conveyance elements to be reused in the conveyance portion.

The chain drive further comprises a plurality of linkages. Each linkage is configured for coupling the drive chain with one of the plurality of conveyance elements. Each link comprises a first end, which is oriented towards and in particular coupled to the drive chain, and an opposing second end which is oriented towards and in particular coupled to one of the conveyance elements.

The length of each of the linkages, which is defined as the distance between the first and second ends of the linkage along the path of the drive chain, is variable.

Exemplary embodiments of the invention further include a people conveyor comprising a plurality of conveyance elements forming a conveyance band, and at least one chain drive according to an exemplary embodiment of the invention.

According to exemplary embodiments of the invention, the length of the linkages along the path of the drive chain is variable. This variability provides an additional degree of freedom for the conveyance elements. As a result, the conveyance elements may be guided space-savingly through the turnaround portions of the drive chain and other portions of their traveling path. This reduces the space needed for the people conveyor, in particular at the turnaround portions. The reduction of the space needed allows for additional freedom when designing the people conveyor. Further, the conveyance elements may be guided smoothly, i.e. without pulsations, through the conveyance portion and the landing portions. This enhances the riding comfort of the passengers using the people conveyor.

A number of optional features are set out in the following. These features may be realized in particular embodiments, alone or in combination with any of the other features.

Each linkage may comprise a first linkage element and a second linkage element. A first end of the first linkage element, which is oriented towards the drive chain, may be pivotably connected to the drive chain. The second linkage element may have a first end, which is pivotably connected to a second end of the first linkage element by means of a joint, and a second end, which is oriented towards one of the conveyance elements. The second end of the second linkage element in particular may be pivotably connected to one of the conveyance elements. Such a combination of two pivotably linked linkage elements provides a suitable and reliable linkage having a variable length.

The chain drive may comprise a plurality of drive chain rollers attached to the drive chain. The drive chain rollers may be guided by at least one drive chain roller guide rail defining the path of the drive chain.

The joints connecting the first and second linkage elements may be provided with a linkage roller, respectively. The linkage rollers may be guided by at least one link-age roller guide rail. Such a configuration allows modifying the lengths of the linkages by setting the shape and the position of the linkage roller guide rail, in particular by varying a distance between the linkage roller guide rail and the at least one drive chain roller guide rail along the path of the drive chain.

The closed path followed by the drive chain links may include two turnaround portions with the conveyance portion being arranged between the two turnaround portions. The conveyance portion may be connected to the turnaround portions by transition portions arranged between the conveyance portion and one of the turn-around portions, respectively.

The at least one linkage roller guide rail may be configured so that a projection of the distance between the second ends of adjacent second linkage elements onto a horizontal plane remains constant when traveling along the transition portions. The projection in the transition portions in particular is the same as in the conveyance portion and in the return portion. This allows using rectangular steps, i.e. steps in which a riser portion is oriented orthogonally with respect to a tread plate, as conveyance elements.

Alternatively, the at least one linkage roller guide rail may be configured and shaped so that the distance between the second ends of adjacent second linkage elements remains constant along the turnaround portions and the transition por-tions. The distance in the transition portions in particular may be the same as in the conveyance portion. Keeping the distance between the second ends of adjacent second linkage elements constant avoids pulsations of the conveyance elements in the direction of conveyance, in particular when traveling along the transition portions. This improves the riding comfort of passengers using the people conveyor.

The conveyance elements may be pallets or steps, in particular bucket steps or steps having a movable skirt.

Conveyance element axles, in the following for simplicity called "step axles", may be attached to the second ends of the second linkage elements, and the conveyance elements may be attached to said step axles. Step axles provide suitable means for reliably connecting the conveyance elements with the linkage elements.

Conveyance element rollers ("step axle rollers") may be attached to the second ends of the second linkage elements. The conveyance element rollers in particular may be supported by the conveyance element axles I step axles. Said conveyance element rollers may be guided by corresponding guide rails for controlling the spatial orientation of the conveyance elements while traveling along their traveling path.

In a people conveyor according to an exemplary embodiment of the invention, the at least one drive chain may be located laterally on a side of the conveyance band.

Alternatively, the at least one drive chain may be located under the conveyance band in the conveyance portion and/or above the conveyance band in the return portion. Such a configuration allows reducing the lateral dimension of the people conveyor.

A chain drive according to an exemplary embodiment of the invention may comprise two drive chains extending parallel to each other at both lateral sides of the conveyance band. Providing two drive chains extending parallel to each other at the lateral sides of the conveyance band allows driving the conveyance elements symmetrically avoiding any tilting forces acting onto the conveyance elements.

In the following exemplary embodiments of the invention are described with reference to the enclosed figures.

Figure 1:
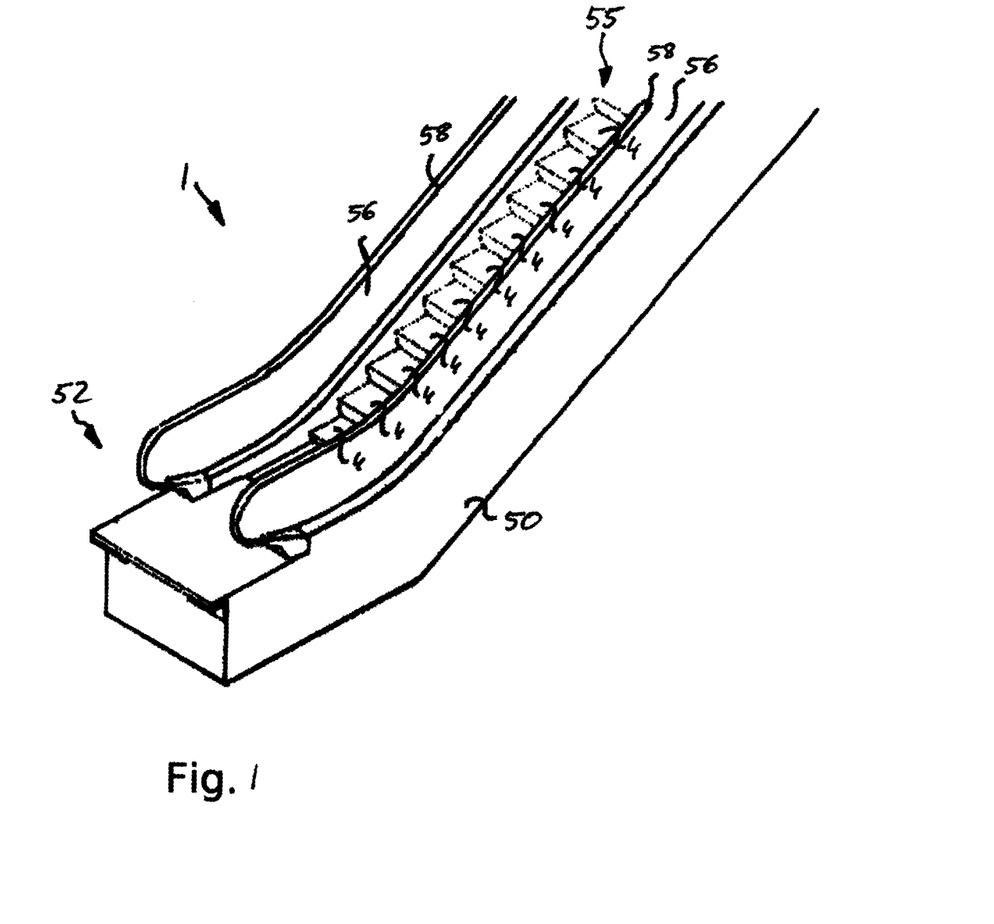
FIG. 1 shows a perspective view of a portion of a people conveyor in which a chain drive according to an exemplary embodiment of the invention may be employed.

FIG. 1 shows a perspective schematic view of a portion of a people conveyor 1 in which a chain drive, which is not visible in FIG. 1, according to an exemplary embodiment of the invention may be employed.

The people conveyor 1 shown in FIG. 1 is an escalator comprising a conveyance band 55 formed of a plurality of conveyance elements (steps) 4. The people conveyor 1 comprises a truss 50 extending in a longitudinal direction of conveyance between a lower landing zone 52 and a corresponding upper landing zone 54 (cf. FIGS. 2 to 4). The upper landing zone 54 is not shown in FIG. 1. Two balustrades 56 supporting moving handrails 58 extend parallel to the conveyance band 55.

Figure 2:
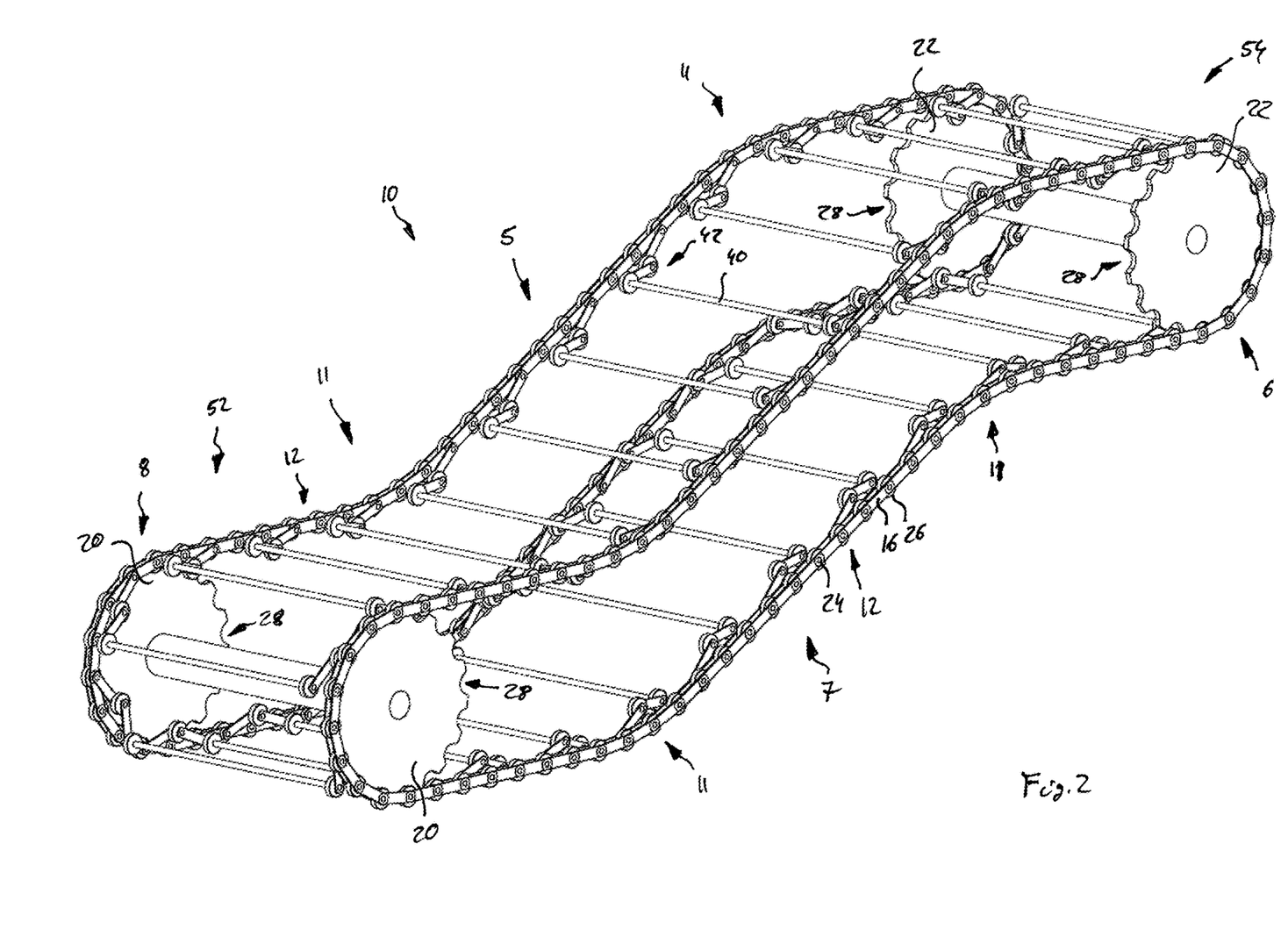
FIG. 2 shows a perspective schematic view of a chain drive according to an exemplary embodiment of the invention.
Figure 3:
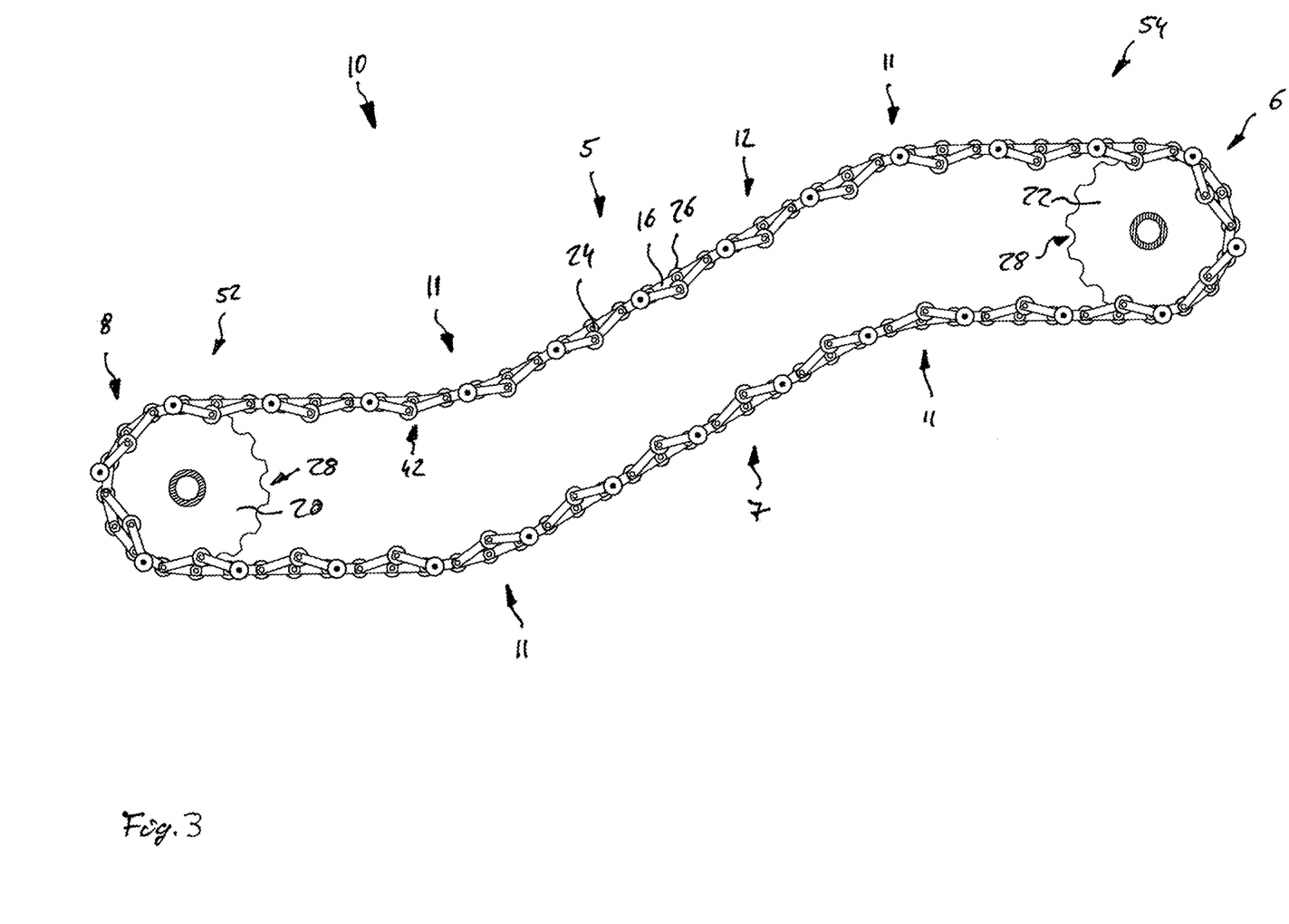
FIG. 3 shows a planar side view of the chain drive shown in FIG. 2.
Figure 4:
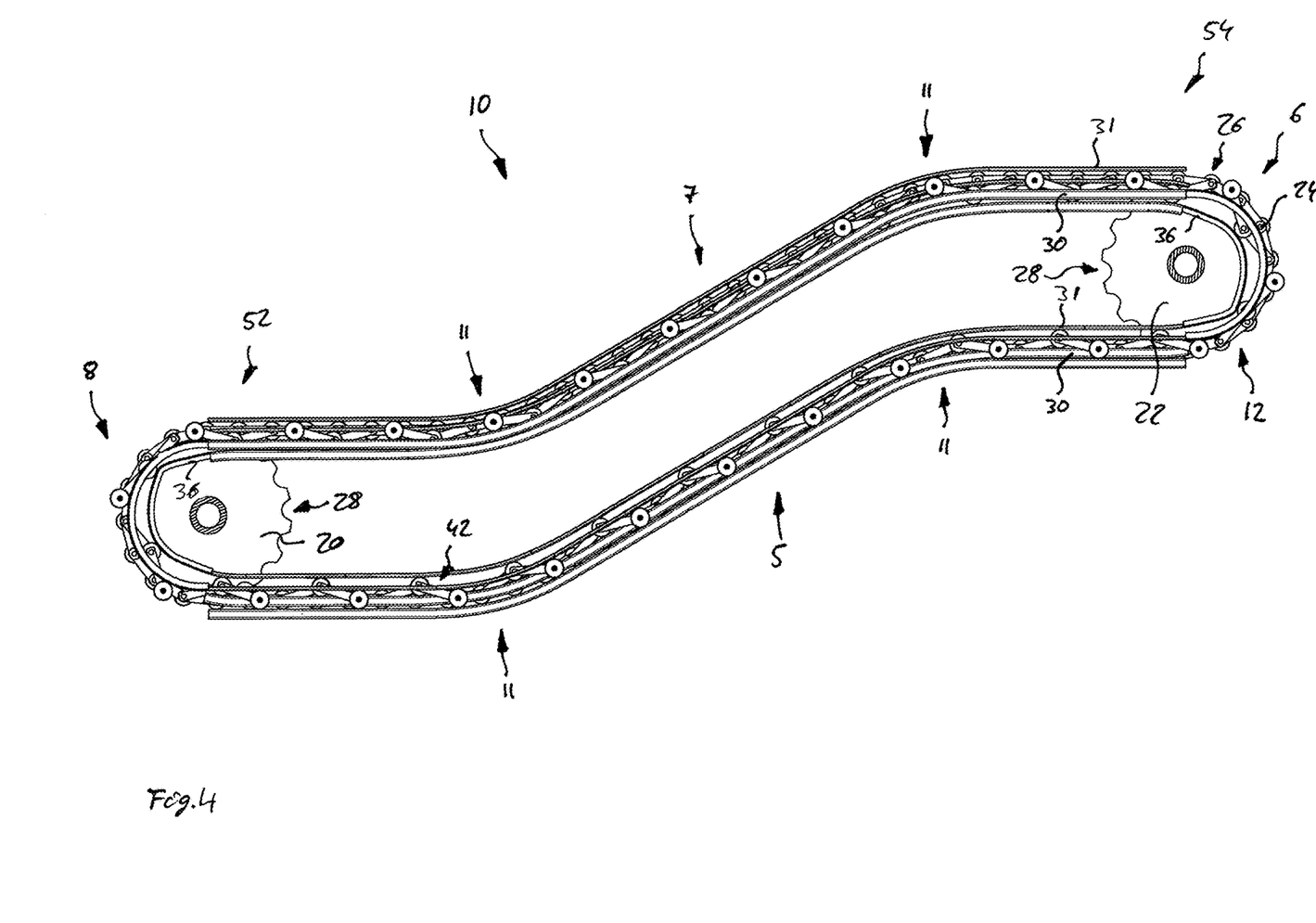
FIG. 4 shows a planar side view of the chain drive shown in FIG. 2 in combination with guide rails.

FIG. 2 shows a perspective view of a chain drive 10 according to an exemplary embodiment of the invention, and FIGS. 3 and 4 show a planar side view thereof, respectively.

The chain drive 10 comprises two drive chains 12 extending parallel to each other along an (upper) conveyance portion 5 and a (lower) return portion 7 between an upper turnaround portion 6, which is located at the upper landing zone 54 and a lower turnaround portion 8, which is located at the lower landing zone 52.

Curved transition portions 11 connect the conveyance portion 5 and the return portion 7 with the turnaround portions 6, 8, respectively. The conveyance portion 5 and the return portion 7 extending between the transition portions 11 follow a linear path having a constant inclination with respect to the horizontal.

Turnaround sprockets 20, 22 are arranged in the turnaround portions 6, 8 for guiding the drive chains 12 around the turnaround portions 6, 8. The turnaround sprockets 20, 22 in at least one of the turnaround portions 6, 8 are driven by an appropriate drive mechanism, in particular including a motor, which is not shown in the figures.

Each of the drive chains 12 comprises a plurality of drive chain links 16 pivotably connected to each other by means of drive chain axles 24. A plurality of drive chain rollers 26 are provided. Each of the drive chain rollers 26 is supported by one of the drive chain axles 24.

For simplicity not all chain links 16, drive chain axles 24, and drive chain rollers 26 are provided with reference signs in FIG. 2 and the following figures.

In the turnaround portions 6, 8 the drive chain rollers 26 are accommodated in corresponding recesses 28 formed on the outer periphery of the turnaround sprockets 20, 22.

The drive chain rollers 26 are further guided by drive chain roller guide rails 30, 31 which are shown in FIG. 4 but not in FIGS. 2 and 3.

The chain drive 10 further comprises a plurality of conveyance element axles ("step axles") 40 configured for supporting the conveyance elements (steps) 4 of the people conveyor 1 (see FIG. 1), which are not shown in FIGS. 2 to 4.

The step axles 40 extend between the two drive chains 12 and are connected to the two drive chains 12 by means of linkages 42. The structure of the linkages 42 is described in the following with reference to FIGS. 5 and 6.

Figure 5:
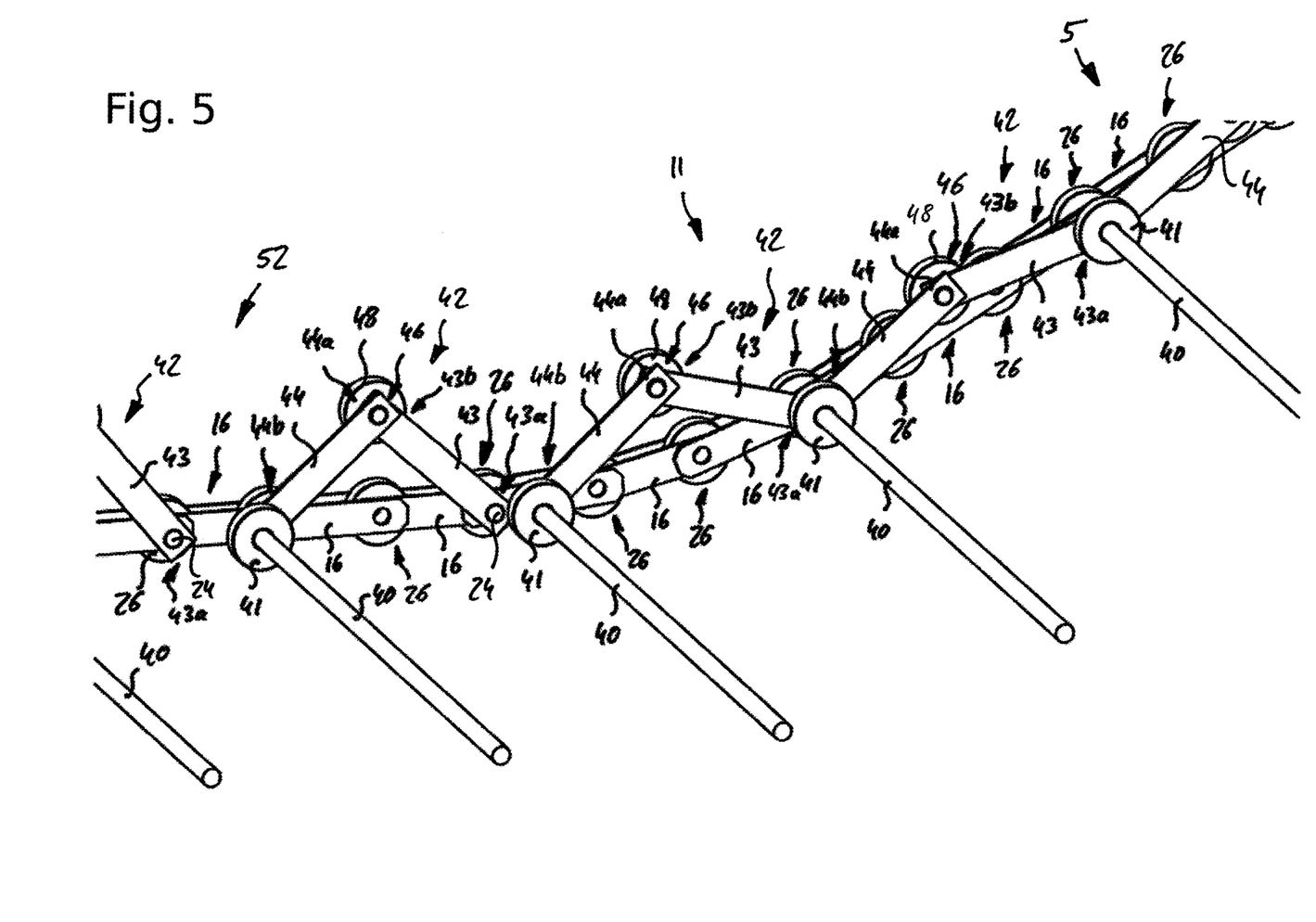
FIG. 5 shows a section of a drive chain and a plurality of conveyance element axles connected to the drive chain.
Figure 6:
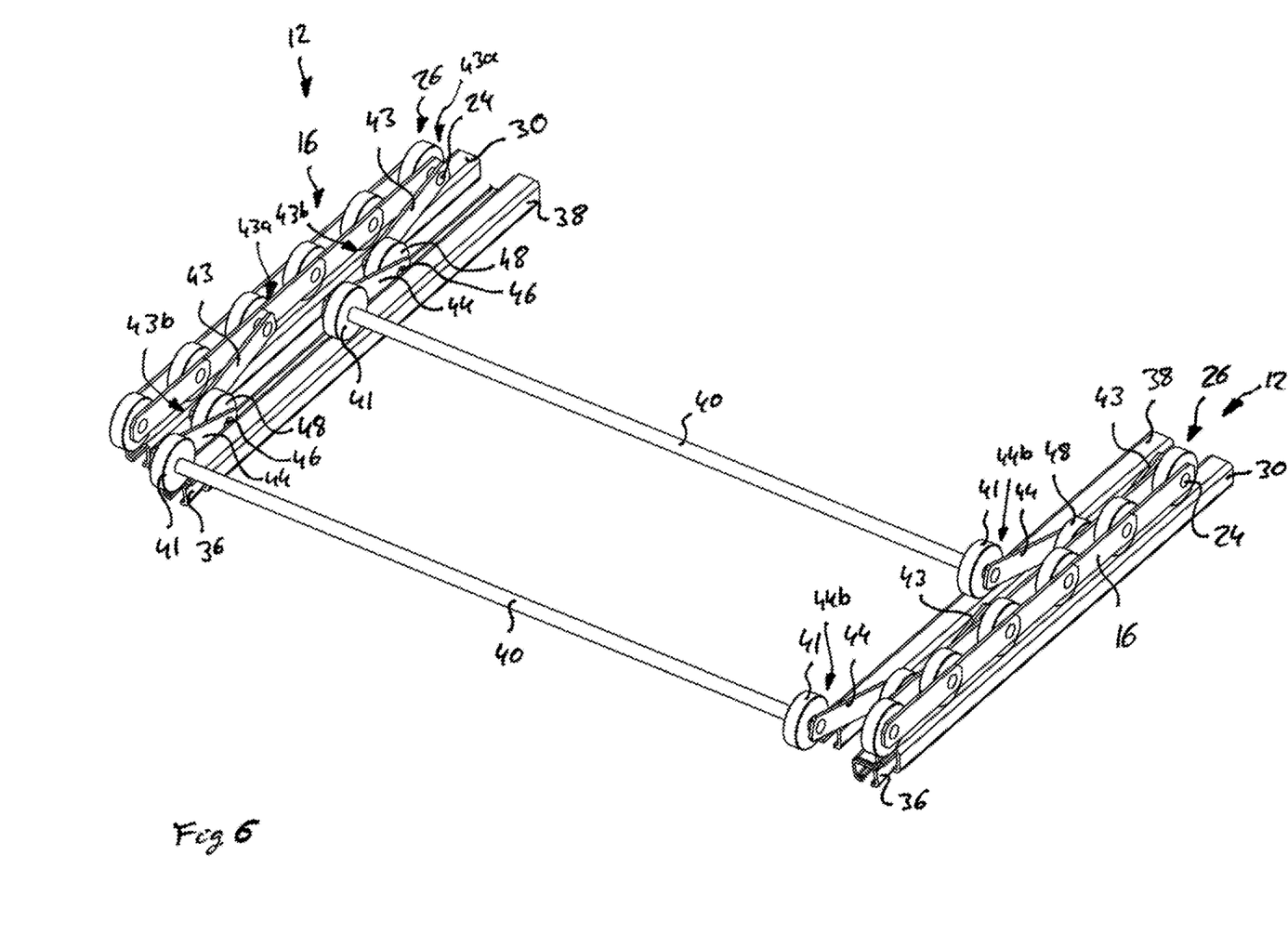
FIG. 6 shows a section of two drive chains and a plurality of conveyance element axles connected to the drive chains.

FIGS. 5 and 6 show a section of a drive chain 12 (FIG. 5) or two drive chains 12 (FIG. 6) and a plurality of step axles 40 connected to the drive chain(s) 12 by means of linkages 42, respectively.

Each linkage 42 comprises a first linkage element 43. In the embodiment disclosed in the figures, the first linkage element 43 has the shape of a basically rectangular plate. A first end 43a of each first linkage element 43 is pivotably coupled to a drive chain axle 24 of the drive chain 12. An opposing second end 43b of each first link-age element 43 is pivotably coupled by means of a joint 46 to a first end 44a of second linkage element 44. In the embodiment shown in the figures, the second linkage element 44 also has the shape of a basically rectangular plate. The first and second linkage elements 43, 44 in particular have the same shape, but in alternative embodiments, which are not shown in the figures, the linkage elements 43, 44 may have different shapes.

A linkage roller 48 is rotatably supported at the joint 46. A step axle 40 is connected to a second end 44b of each second linkage element 44 opposite to the first end 44a. A conveyance element roller ("step axle roller") 41 is rotatably supported at said second end 44b of each of the second linkage elements 44.

Figure 7:
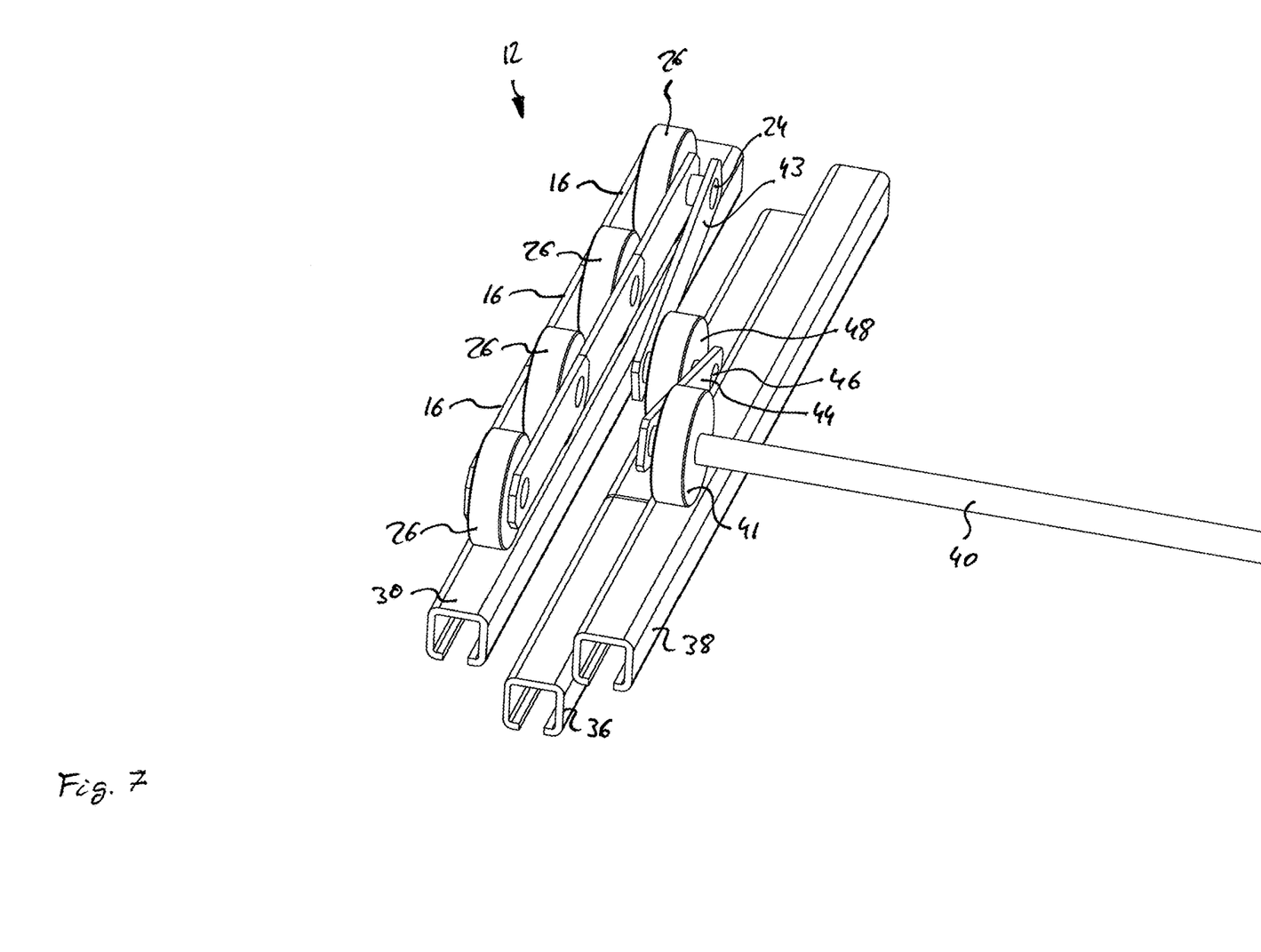
FIG. 7 is a perspective view illustrating the interaction of drive chain rollers sup-ported by the drive chain with corresponding drive chain roller guide rails.
Figure 12:
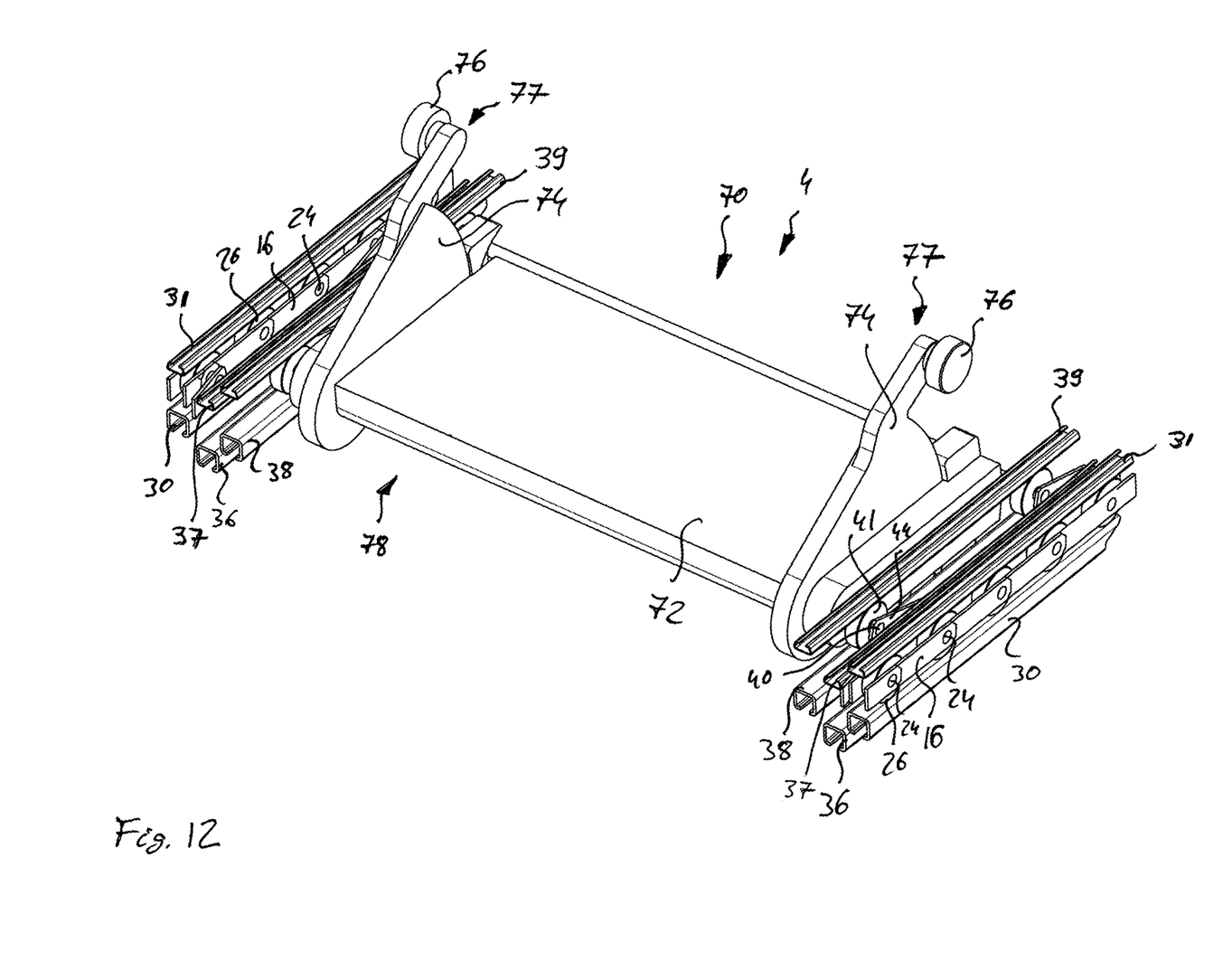
FIG. 12 is a perspective view of a bucket step connected to a chain drive according to an exemplary embodiment of the invention.

The linkage rollers 48 are supported and guided by linkage roller guide rails 36, 37 (cf. FIGS. 4, 6, 7 and 12), and the conveyance element rollers 41 are supported and guided by corresponding conveyance element roller guide rails 38, 39 (cf. FIGS. 6, 7 and 12). For clarity, the guide rails 36, 37, 38, 39 are not depicted in FIG. 5 and only some of the guide rails 36, 37, 38, 39 are shown in FIGS. 4, 6, and 7, respectively.

In the exemplary embodiment shown in the figures, linkages 42 are connected to every third drive chain axle 24 of the drive chain 12. The skilled person, however, will understand that the number of linkages 42 with respect to the number of drive chain links 16 may be varied according to respective needs. The number of link-ages 42 with respect to the number of drive chain links 16 in particular may depend on the length of the drive chain links 16 with respect to the lengths of the first and second linkage elements 43, 44.

In particular, each of the conveyance elements 4 (cf. FIG. 1) may be coupled to the drive chain 12 by one of the linkages 42 so that the number of linkages 42 coupled to the step chain 12 is equal to the number of conveyance elements 4.

As the first linkage element 43 is pivotably connected to the drive chain axle 24 and the second linkage element 44 is pivotably connected to the first linkage element 43 by means of the joint 46, the position of the step axle 40 may be varied by pivoting the first linkage element 43 with respect to the drive chain 12 at the drive chain axle 24 and by pivoting the second linkage element 44 with respect to the first linkage element 43 at the joint 46. In consequence, the position of the step axle 40 connected to the second end 44b of the second linkage element 44 is variable with respect to the drive chain 12.

The position of the step axle 40 with respect to the drive chain 12 in particular may be defined and varied by an appropriate shape of the guide rails 30, 31, 36, 38 (see FIGS. 4 and 6) guiding the rollers 26, 41, 48, respectively. FIG. 7 illustrates in a perspective view the interaction of the rollers 26, 41, 48 with the corresponding guide rails 30, 36, 38. Guide rail 31 shown in FIG. 4 is not depicted in FIG. 7.

By varying the distance between the guide rails 30, 31, 36, 38 with respect to each other along the traveling path of the drive chain 12, the distances of the rollers 26, 41, 48 with respect to each other may be varied. Varying the distances between the rollers 26, 41, 48 results in a variation of the angle between the two linkage elements 43, 44. In consequence, the length of the linkage 42 projected onto the length of the drive chain 12 and/or the length of the linkage 42 projected onto a virtual horizontal plane (not shown) may be adjusted.

Figure 8:
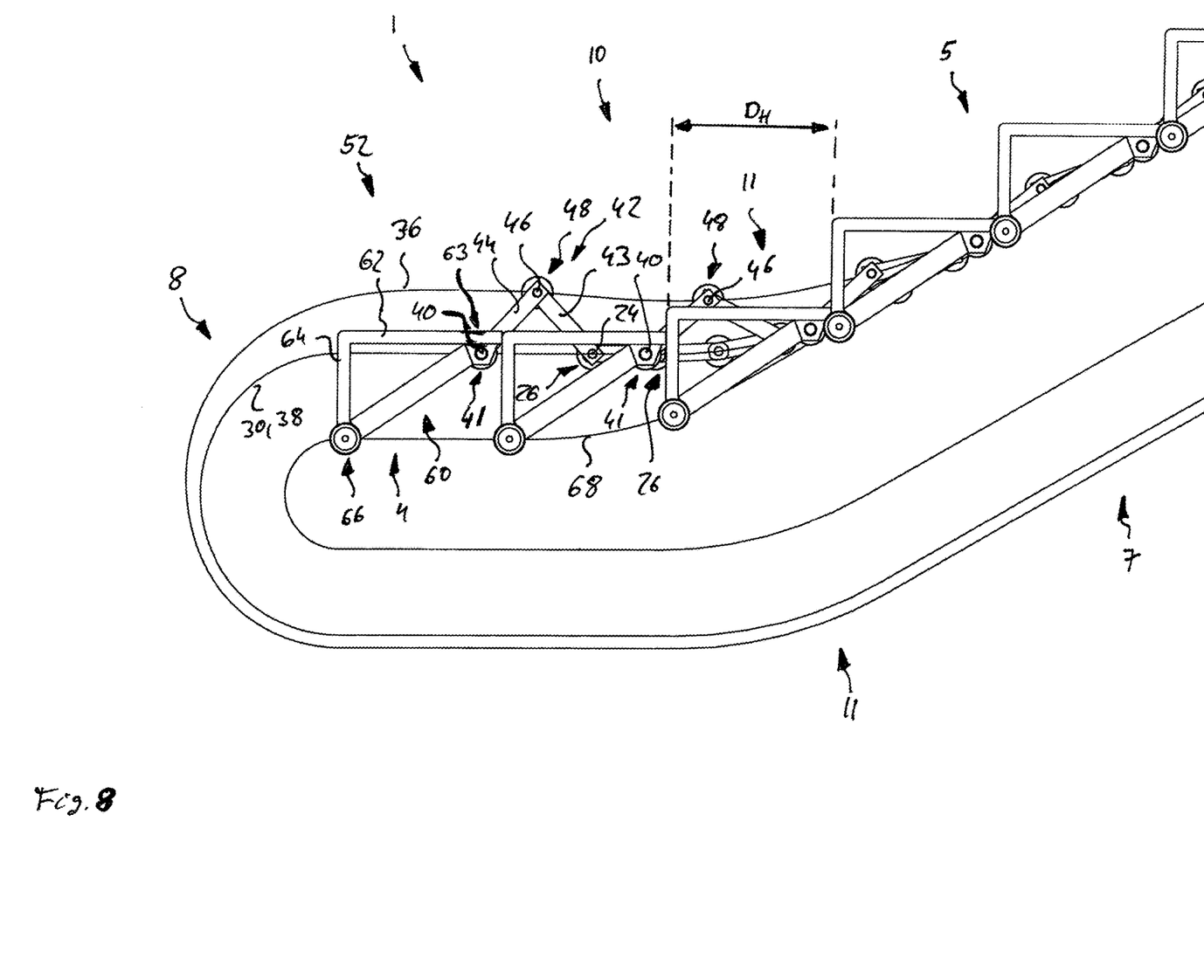
FIGS. 8 and 9 are schematic side views of a people conveyor comprising rectangular steps and a chain drive according to an exemplary embodiment of the invention.
Figure 9:
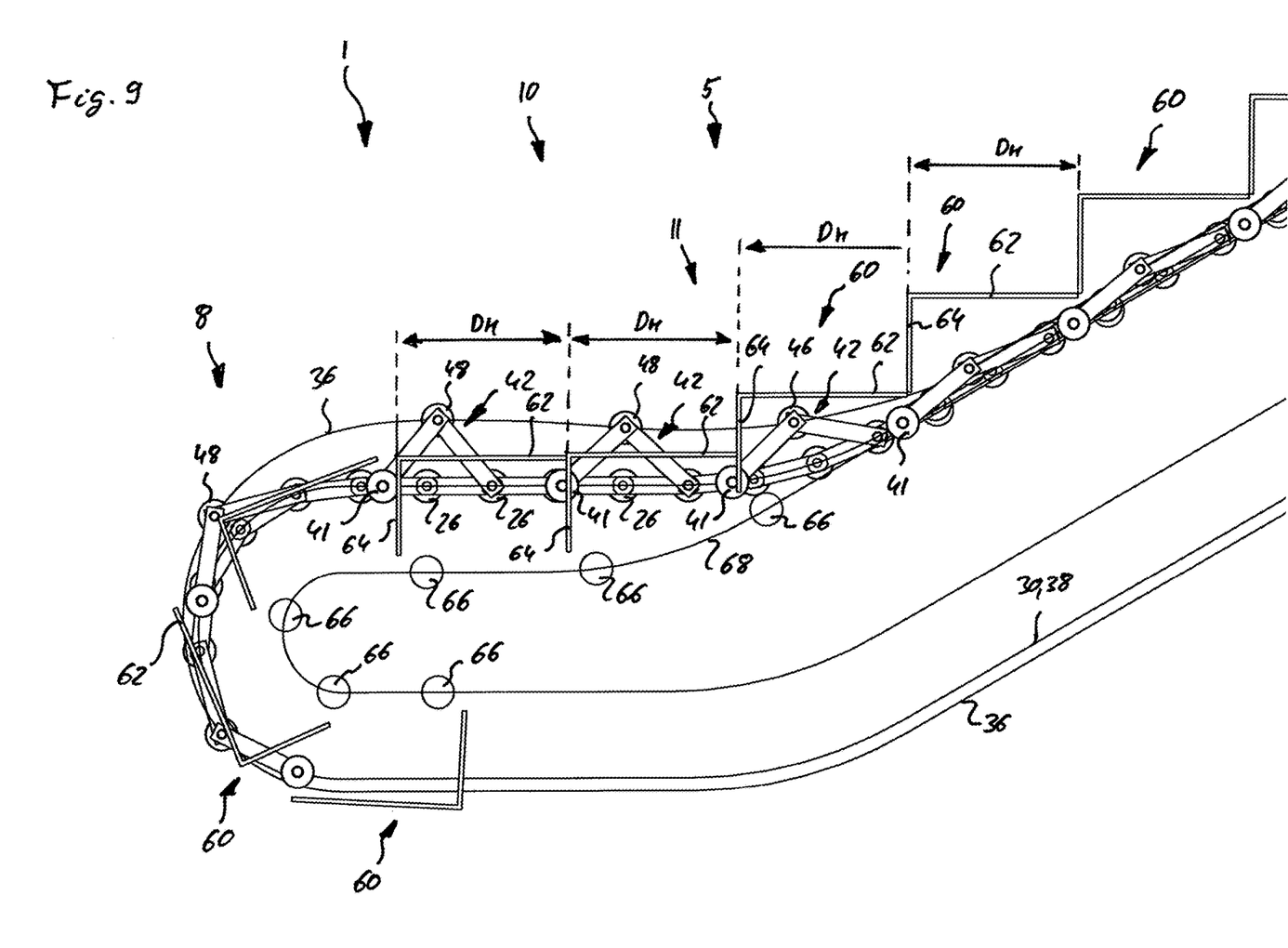

FIGS. 8 and 9 are schematic side views of a chain drive 10 according to an exemplary embodiment of the invention, wherein rectangular steps 60, which are employed as conveyance elements 4, are connected to the step axles 40.

Each rectangular step 60 comprises a tread plate 62, which is oriented substantially horizontally in the conveyance portion 5, the horizontally extending landing portions 52, 54 and the intermediate transition portions 11 connecting the conveyance portion 5 with the landing portions 52, 54 (only the lower landing portion 52 and a single transition portion 11 are shown in FIG. 8).

Each rectangular step 60 further comprises a linear, i.e. non-arcuate, riser portion 64, which is oriented substantially orthogonally with respect to the tread plate 62. In consequence, the linear riser portion 64 is orientated substantially vertically when the tread plate 62 is oriented horizontally, as it is shown in FIG. 8.

A rear end 63 of each tread plate 62, i.e. an end 63 opposite to the riser portion 64, is pivotably connected to one of the step axles 40. A step roller 66 is supported at an end of the riser portion 64 opposite to the tread plate 62.

A step roller guide rail 68 guiding the step rollers 66 is provided in addition to the previously mentioned guide rails 30, 36, 38 supporting and guiding the rollers 26, 44, 48 provided at the drive chain 12 and the linkage 42.

By guiding all the rollers 26, 44, 48, 66 along appropriately shaped guide rails 30, 36, 38, 68, the rectangular steps 60 may be guided through the landing portions 52, 54, the transitions portions 11, the conveyance portion 5 and the return portion 7 in a configuration in which the "horizontal distance DH", which is defined as the projection of the distance between the riser portions 64 of adjacent steps 60 onto a virtual horizontal plane (not shown), does not change. Keeping the horizontal distance DH constant allows using rectangular steps 60 instead of conventional steps having an arcuate riser portion. It further allows saving space when guiding the rectangular steps 60 around the turnaround portions 6, 8, as it is schematically illustrated in FIG. 9 for the lower turnaround portion 6.

The horizontal distance DH may be in the range of 300 mm to 500 mm, it in particular may be 400 mm.

Figure 10:
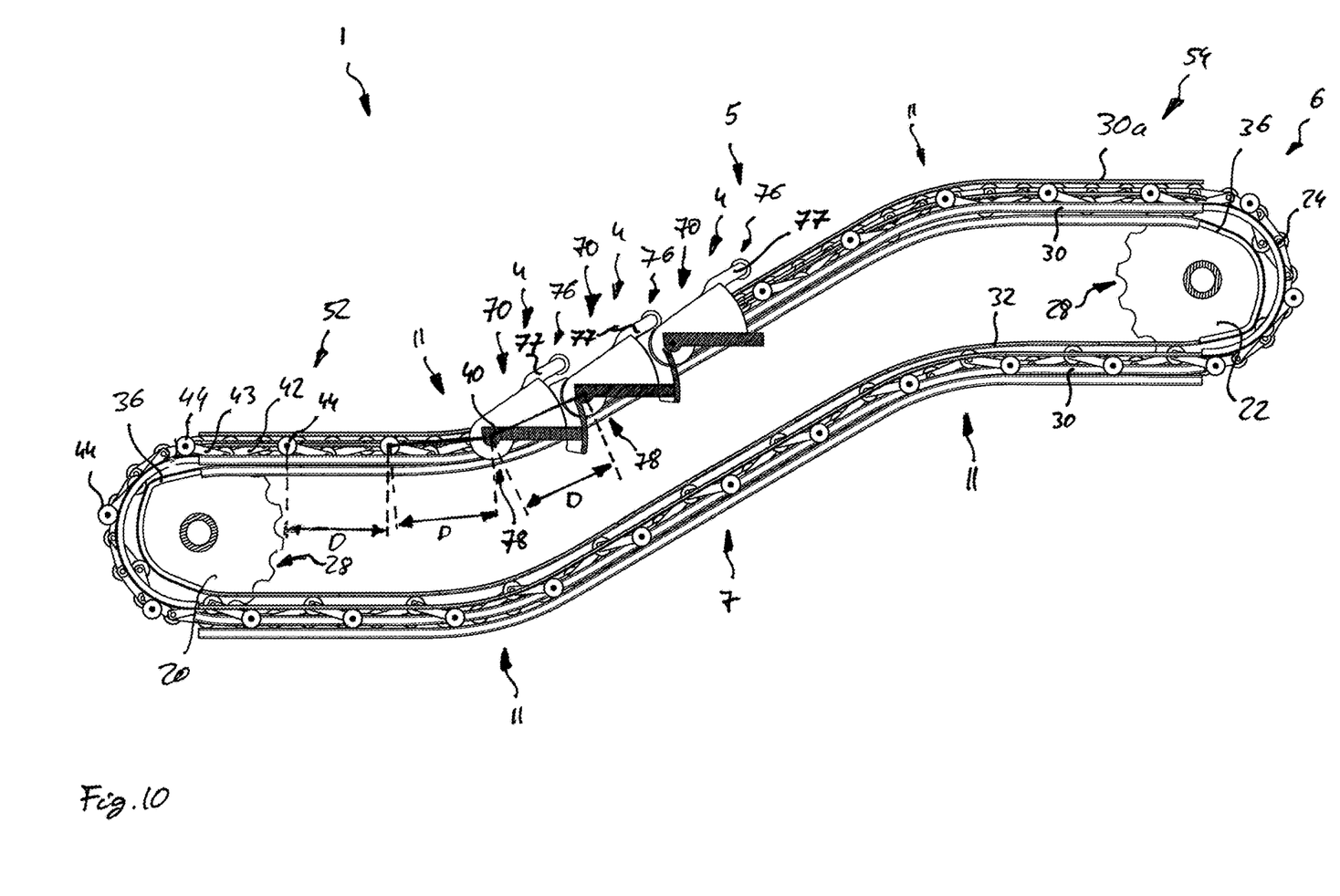
FIG. 10 is a planar side view of a people conveyor comprising bucket steps and a chain drive according to an exemplary embodiment of the invention.
Figure 11:
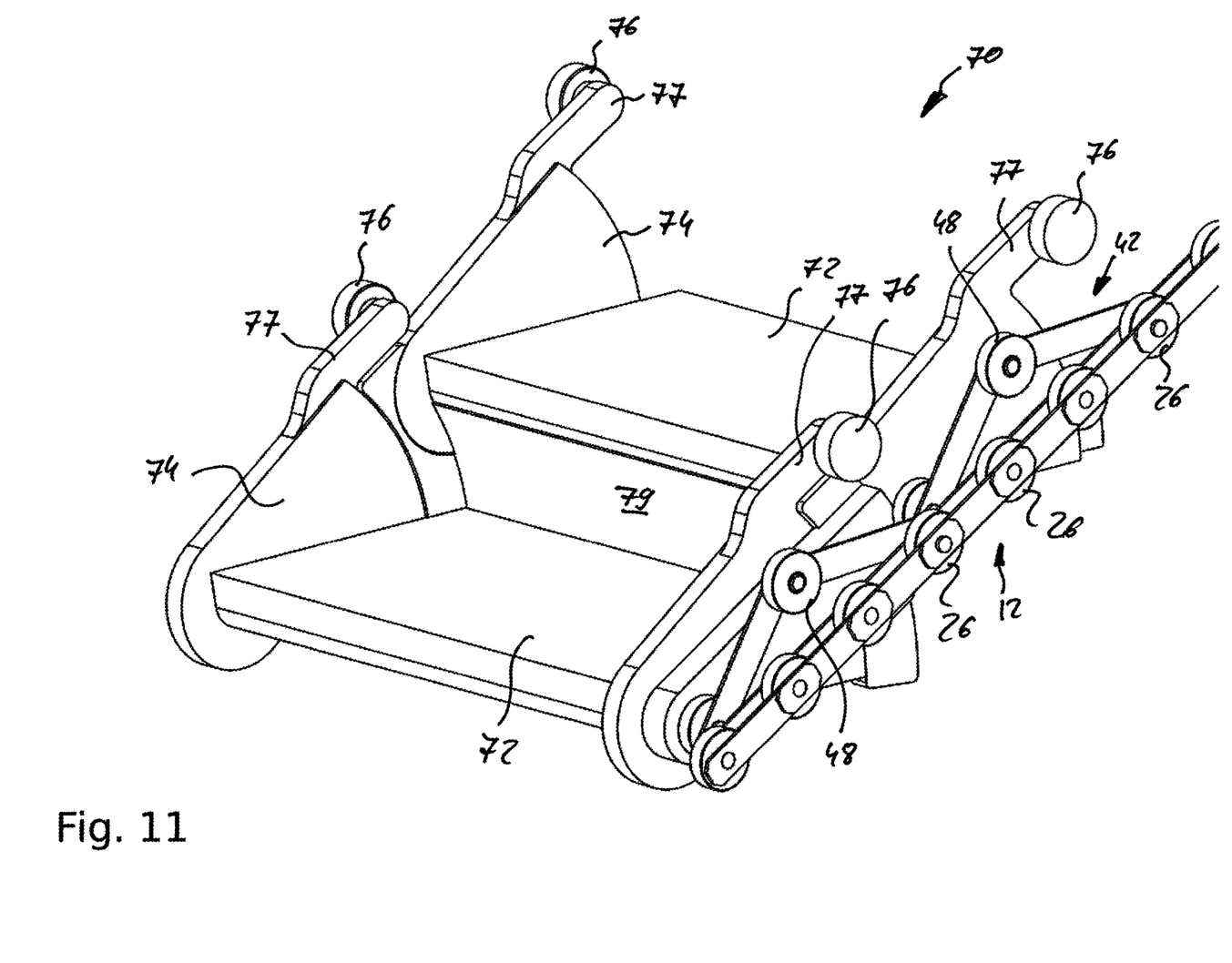
FIG. 11 is a perspective view of two bucket steps arranged between two drive chains.

FIGS. 10 and 11 illustrate an alternative exemplary embodiment in which bucket steps 70 are employed as conveyance elements 4. FIG. 12 shows an enlarged view of a tread plate 72 of a bucket step 70 attached to two drive chains 12. Each bucket step 70 comprises a tread plates 72, which is configured for supporting passengers, and two side portions 74, which are formed integrally with, or rigidly attached to, both lateral sides of the tread plate 72.

Each bucket step 70 further comprises a bucket 79 closing the vertical gap be-tween the tread plates 72 of adjacent bucket steps 70. The buckets 79, which are provided separately from the tread plates 72, are only shown in FIG. 11 but not in FIGS. 10 and 12.

A front end 78 of each tread plates 72 is attached to a step axle 40. Step rollers 76 are provided at rear upper ends 77 of the side portions 74. The step rollers 76 are supported and guided by corresponding step roller guide rails, which are not shown in the figures.

The orientation of the tread plates 72 may be controlled by the shape of the guide rails 30, 31, 36, 37, 38, 39 supporting and guiding the corresponding rollers 26, 44, 48, 76.

The shapes of the guide rails 30, 31, 36, 37, 38, 39 in particular may be set so that the distance D between two adjacent step axles 40 is constant over the whole traveling path of the drive chain 12, in particular in the turnaround portions 6, 8, the transition portions 11 and the conveyance portion 5.

In consequence, there is no pulsation in the movement of the step axles 40, and as a result, the riding comfort of the passengers using the people conveyor 1 is considerably enhanced.

Further, as the distance D between adjacent step axles 40 may be set independently of the length of the drive chain links 16, a conventional drive chain 12 in combination with conventional turnaround sprockets 20, 22, e.g. turnaround sprockets 20, 22 having at least sixteen teeth, may be used. Using turnaround sprockets 20, 22 having sixteen or more teeth allows limiting the polygonal effect to an acceptable level. Using standard components, such as conventional drive chains 12 and conventional turnaround sprockets 20, 22, reduces the costs of manufacturing and installing the chain drive 10 of the people conveyor 1.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiments disclosed, but that the invention includes all embodiments falling within the scope of the dependent claims.

REFERENCES 1 people conveyor
4 conveyance elements
5 conveyance portion
6 upper turnaround portion
7 return portion
8 lower turnaround portion
9 return portion
10 chain drive
11 transition portion
12 drive chain
16 drive chain link
20 turnaround sprocket
22 turnaround sprocket
24 drive chain axle
26 drive chain roller
28 recess
30 chain roller guide rail
31 chain roller guide rail
36 linkage roller guide rail
37 linkage roller guide rail
38 step roller guide rail
39 step roller guide rail
40 conveyance element axle I step axle
41 conveyance element roller I step axle
42 linkage
43 first linkage element
43 first end of the first linkage element
43 second end of the first linkage element
44 second linkage element
44 first end of the second linkage element
44 second end of the second linkage
46 joint
48 linkage roller
52 lower landing zone
54 upper landing zone
58 handrail
60 rectangular step
62 tread plate
63 read end of the tread plate
64 riser portion
66 step roller
70 bucket step
72 tread plate
74 side portion
76 step roller
77 rear upper ends of the side
78 front end of the tread plate
79 bucket

What is claimed:

1. Chain drive for a people conveyor having a plurality of conveyance elements, the chain drive comprising
   a drive chain configured for driving the conveyance elements, the drive chain comprising a plurality of drive chain links traveling along a closed path including a conveyance portion and a return portion; and a plurality of linkages;
   wherein each linkage is configured for coupling the drive chain with one of the plurality of conveyance elements; and
   wherein the length of each of the linkages along the path of the drive chain is variable;
   wherein each linkage comprises:
   a first linkage element having a first end pivotably connected to the drive chain; and
   a second linkage element comprising a first end, which is pivotably connected to a second end of the first linkage element by a joint, and a second end, which is pivotably connected to one of the conveyance elements.

2. Chain drive according to claim 1, wherein the joint is provided with a linkage roller, the linkage roller being guided by at least one linkage roller guide rail.

3. Chain drive according to claim 2, wherein the closed path includes two turnaround portions and wherein the conveyance portion is arranged be-tween the two turnaround portions and connected to said turnaround portions by transition portions.

4. Chain drive according to claim 3, wherein the at least one linkage roller guide rail is configured so that the distance between the second ends of adjacent second linkage elements remains constant when traveling along the turnaround portions and/or along the transition portions.

5. Chain drive according to claim 3, wherein the at least one linkage roller guide rail is configured so that a projection of the distance between the second ends of adjacent second linkage elements onto a horizontal plane remains constant when traveling along the turnaround portions and/or along the transition portions.

6. Chain drive for a people conveyor having a plurality of conveyance elements, the chain drive comprising
   a drive chain configured for driving the conveyance elements, the drive chain comprising a plurality of drive chain links traveling along a closed path including a conveyance portion and a return portion and a plurality of linkages;
   wherein each linkage is configured for coupling the drive chain with one of the plurality of conveyance elements;
   wherein the length of each of the linkages along the path of the drive chain is variable; and
   a plurality of drive chain rollers which are coupled to the drive chain and which are guided by at least one drive chain roller guide rail.

7. Chain drive according to claim 1, comprising step axles coupled to the second ends of the second linkage elements, wherein the step axles are configured for supporting the conveyance elements.

8. Chain drive for a people conveyor having a plurality of conveyance elements, the chain drive comprising
   a drive chain configured for driving the conveyance elements, the drive chain comprising a plurality of drive chain links traveling along a closed path including a conveyance portion and a return portion and a plurality of linkages;
   wherein each linkage is configured for coupling the drive chain with one of the plurality of conveyance elements;
   wherein the length of each of the linkages along the path of the drive chain is variable;
   step axles coupled to the second ends of the second linkage elements, wherein the step axles are configured for supporting the conveyance elements; and
   conveyance element rollers supported by the conveyance element axles.

9. People conveyor comprising a plurality of conveyance elements forming a conveyance band, and at least one chain drive according to claim 1.

10. People conveyor according to claim 9, wherein the conveyance elements are steps, in particular rectangular steps, comprising a tread plate and a riser portion orthogonally extending from the tread plate.

11. People conveyor comprising a plurality of conveyance elements forming a conveyance band and at least one chain drive, the chain drive comprising:
- a drive chain configured for driving the conveyance elements, the drive chain comprising a plurality of drive chain links traveling along a closed path including a conveyance portion and a return portion and a plurality of linkages;
- wherein each linkage is configured for coupling the drive chain with one of the plurality of conveyance elements; and
- wherein the length of each of the linkages along the path of the drive chain is variable;
- wherein the conveyance elements are bucket steps.

12. People conveyor according to claim 9, wherein the chain drive comprises two drive chains extending parallel to each other along opposing lateral sides of the conveyance band.

13. People conveyor according to claim 12, wherein the drive chains are located next to the conveyance elements in a lateral direction.

14. People conveyor according to claim 12, wherein the drive chains are located under the conveyance elements in the conveyance portion.

* * * * *